United States Patent [19]
Krupey

[11] Patent Number: 5,885,921
[45] Date of Patent: Mar. 23, 1999

[54] HYDROPHOBIC SILICA ADSORBENTS FOR LIPIDS

[75] Inventor: John Krupey, Glen Rock, N.J.

[73] Assignee: Ligochem, Inc., Fairfield, N.J.

[21] Appl. No.: 740,266

[22] Filed: Oct. 25, 1996

[51] Int. Cl.$^6$ ............................... B01J 21/08; B01J 20/10
[52] U.S. Cl. ........................... 502/233; 502/407; 436/71; 436/72; 554/175; 554/193
[58] Field of Search ............................. 428/405; 106/490; 554/193, 175, 191, 211; 436/71, 72; 502/233, 407

[56] References Cited

U.S. PATENT DOCUMENTS 5,171,870  12/1992  Kulpraghipanja ..................... 554/193
5,304,243   4/1994  Yamaguchi et al. ................... 428/405

*Primary Examiner*—Ponnathapura Achutamurthy
*Assistant Examiner*—P. Ponnaluri
*Attorney, Agent, or Firm*—Omri M. Behr, Esq.

[57] ABSTRACT

There is provided a process for the preparation of a highly reactive hydrophobic silica capable of lipophilic binding of lipids present in aqueous media, in particular body fluids. The hydrocarbon substituted silica utilized in the first step of this process may be prepared from hydrophilic silica, suitably pyrogenic silica. This is then treated with a volatile hydrocarbon substituted silicon compound. The next step of the process comprises treating the substituted hydrophobic silica with an alcohol. In order to enable the thus produced material to selectively adsorb lipids in the presence of protein, to the substantial non absorption of the proteins (other than lipoproteins), a further step is carried out. This comprises treating with aqueous ammonia or amines wherein substituents on the amine nitrogen may be the same or different. Also included in the scope of the present invention is the use of the above materials in procedures for absorbing lipids from aqueous media, suitably body fluids both together with and to he substantial exclusion of proteins.

22 Claims, 3 Drawing Sheets

Hydrophobic Silica

Hydrophobic Silica

HYDROPHOBIC SILICA ADSORBENTS FOR LIPIDS

FIELD OF THE INVENTION

Adsorbents comprising a hydrophobic silica substrate for the adsorption of lipids from aqueous media.

DESCRIPTION OF THE PRIOR ART

Alcohol treated hydrophobic silica formed from Aerosil R972 is presently marketed under the trademark CLEANASCITE by Applicant's assignee. U.S. Pat. No. 5,304,243, to Yamaguchi, employs an alkoxy silane (SiOR, R=alkyl) in his reaction, which is subsequently hydrolyzed to yield the desired product. Alcohol ammonia solutions were also employed. In contrast thereto, in the present invention, no alkoxy derivatives of any sort form were employed to derivatize the activated hydrophobic silica. Furthermore, the starting material herein does not contain alkoxy groups. Applicant has shown that if amination is conducted in the presence of alcohol, the product that is obtained has poor adsorptive properties. In order to generate a product with good adsorptive properties amination must be performed in an alcohol free medium. U.S. Pat. No. 4,767,670 to Cox discloses compounds which contain hydroxy ethyl groups. The products of the present invention do not contain hydroxy ethyl groups. The Cox configuration interacts with nucleic acids, the aminated alcoholated hydrophobic silicas of the present invention do not interact with nucleic acids to any appreciable extent. In U.S. Pat. No. 4,746,572 to Glajch, there are employed alkyl ammoniated branched alkyl chain silica derivatives for purposes of chromatography and peptide synthesis. The compositions produced in the present invention contains methyl groups directly attached to the silicon atom. Unlike the Glajch product which can function as a chromatographic support, the present product cannot be employed in chromatographic procedures since water cannot flow freely between the interstices of the hydrophobic particles.

SUMMARY OF THE INVENTION

There is provided a process for the preparation of a highly reactive hydrophobic silica capable of lipophilic binding of lipids present in aqueous media, in particular body fluids.

The hydrocarbon substituted silica utilized in the first step of this process may be prepared from hydrophilic silica, suitably pyrogenic silica, produced by flame hydrolysis of silicon tetrachloride in an oxygen/hydrogen flame. This is then treated with a volatile hydrocarbon substituted silicon compound such as a halo silane, alkoxy silane, siloxane, silazane and the like, to convert it into hydrophobic, non water wettable form. Such material is commercially available in various grades under the trade name of AEROSIL® manufactured by Degussa, (Frankfurt, Germany) and CAB-O-SIL® manufactured by Cabot Corporation, Tuscaloosa Ala.). Suitably, these particles have a size of between 5 and 10 nanometers and a surface area of between 150 and 300 $m^2$/gram.

It is important to note that the silicas utilized herein are prepared by a pyrogenic process and are not classified as silica gels. Silica gels are made according to a "wet process". Silica gels have a large inner surface (as well as an outer surface) which results in high adsorptive capacity. The presently used particles derived by flame hydrolysis have only an outer surface. Thus, at first glance, it would seem that if a matrix with a high adsorptive capacity was desired the obvious choice would be silica gel. Surprisingly, the present invention shows the contrary to be the case.

The next step of the process comprises treating the substituted hydrophobic silica with an alcohol. The substituents on the silica and those forming the hydrocarbon portion of the alcohol are the same or different and are, suitably, selected from the group consisting of alkyl, alkenyl, aralkyl or aralkenyl.

The lipophilicity of the foregoing categories of alcohol treated hydrophobic silicas can be substantially enhanced by two factors. First by dispersing the materials in water, washing with water suitably with dilute saline, until there is no alcohol in the wash supernate, and then, if desired, aspirating the water. Second by utilizing Aerosils® of much smaller diameter and larger surface area than has heretofore been used, say, for the manufacture of presently commercially available CLEANASCITE® (manufactured by LigoChem, Inc., Fairfield, N.J.)

In order to enable the thus produced material to selectively adsorb lipids in the presence of protein, to the substantial non absorption of the proteins (other than lipoproteins), a further step is carried out. This comprises treating with aqueous ammonia or amines wherein substituents on the amine nitrogen may be the same or different and are, suitably, selected from the group consisting of hydrogen, alkyl, alkenyl, aryl, aralkyl or aralkenyl. While it is preferred that the silica particles have a size of between 5 and 10 nanometers and a surface area of between 150 and 300 $m^2$/gram, in the ammonia/amine treatment step, this size limitation is not critical.

While a structure and mechanism for lipophilic adsorption are illustrated in the figures, the location of the ammonia/amino groups on the alcohol/water treated silica is not certain. For the mechanism to be effective, it must be carried out in the order: alcohol . . . water . . . ammonia/amine. Omission of either of the previous steps will not permit the formation of an efficient lipid adsorbent capable of differentiating between lipids and proteins. While applicant is not bound thereby, it is postulated that the ammonia/amine reacts with the open hydroxyl groups on the silica atoms. That is to say, those sites which did not become, say, alkylated after, say, the originally pyrogeneric silica, had been reacted with a hydrocarbon-substituted halo silane, and then quenched. No theory is advanced as to the mode of binding to these sites.

The present invention further includes both types of products produced by the above processes. That is to say those alcohol and water treated hydrophobic silicas, of the specified particle size range, which are generally lipophilic as well as those subjected to further treatment with ammonia or amines which are selective against proteins.

Also included in the scope of the present invention is the use of the above materials in procedures for absorbing lipids from aqueous media, suitably body fluids both together with and to the substantial exclusion of proteins.

Specifically, in bioprocessing, clarifying ascites fluid and tissue culture removing both envelope and non envelope viruses from biological fluids and colloidal lipid and cell debris from bacteria and yeast homogenates in the purification of recombinant proteins. In the processing of blood products, removing lipids and lipoproteins from whole blood and serum, facilitating the isolation or analysis of blood products such as hemoglobin. In molecular biology, purifying the sequencing quality of M 13 DNA after alcohol extraction, clarifying tissue culture and organ homogenates during the isolation of genomic DNA and total RNA, and removing ionic and nonionic detergents from biological extracts.

One of the major problems encountered when using "activated" hydrophobic silicas for the adsorption of lipophiles from a protein containing medium (e.g. immunoglobulin) is the concomitant removal of some of the desired protein. It was found that the larger the number of hydrophobic groups per unit area of particle the greater is the extent of proteins adsorption. Thus one of the purposes of the present invention is to provide a hydrophobic silica of high affinity for lipids and simultaneously low affinity for proteins.

DESCRIPTION OF THE PREFERRED EMBODIMENTS

Figure 1:
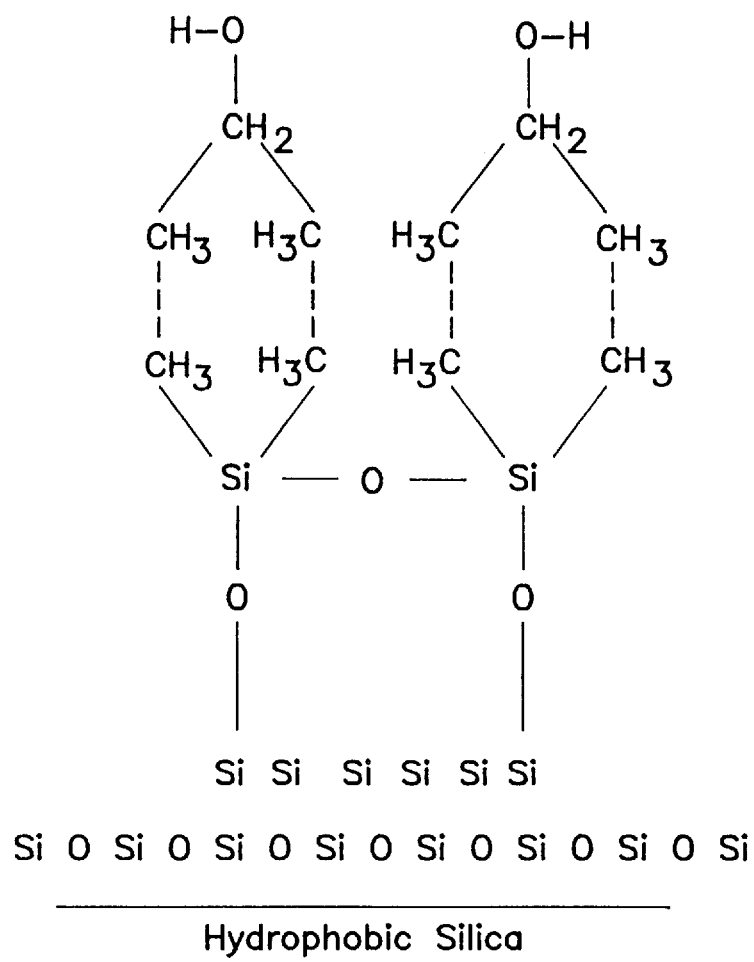
FIG. 1 shows the attachment of isopropyl alcohol to hydrophobic silica.
Figure 2:
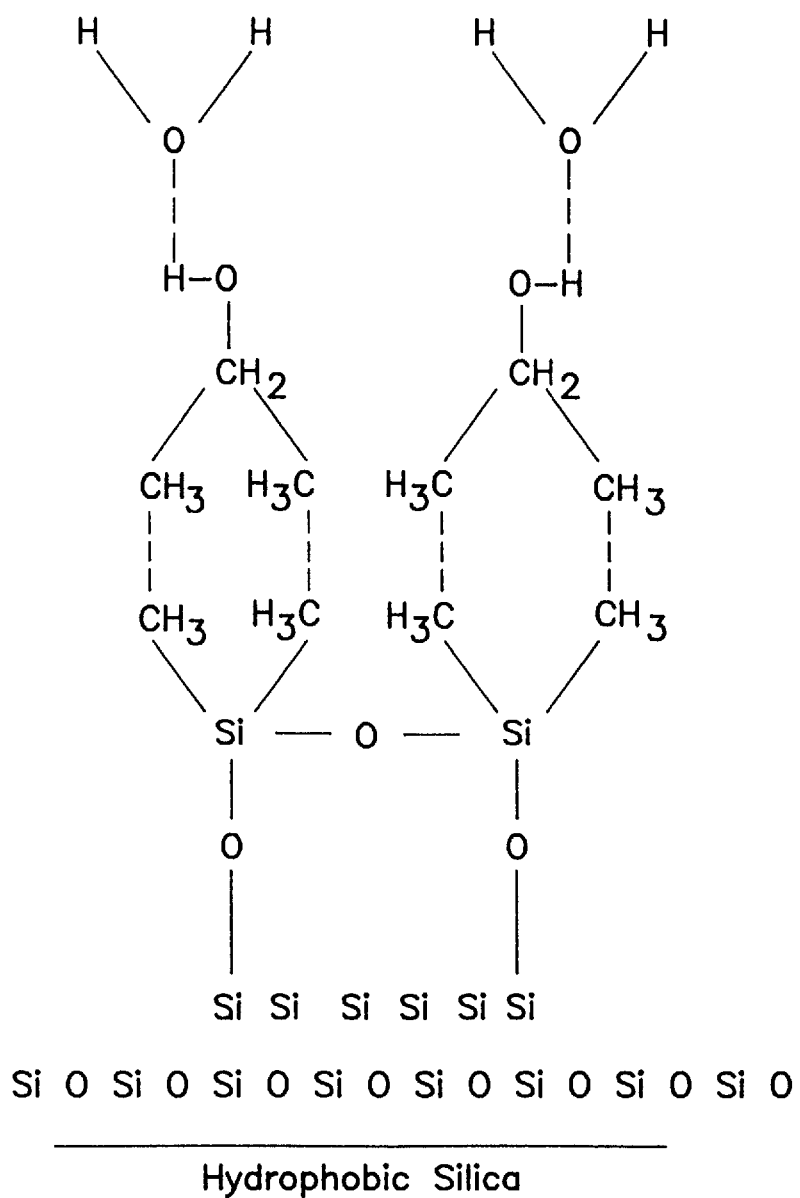
FIG. 2 shows the binding of water to the hydroxyl groups Isopropyl alcohol bound to the material of FIG. 1 to yield an activated hydrophobic silica.
Figure 3:
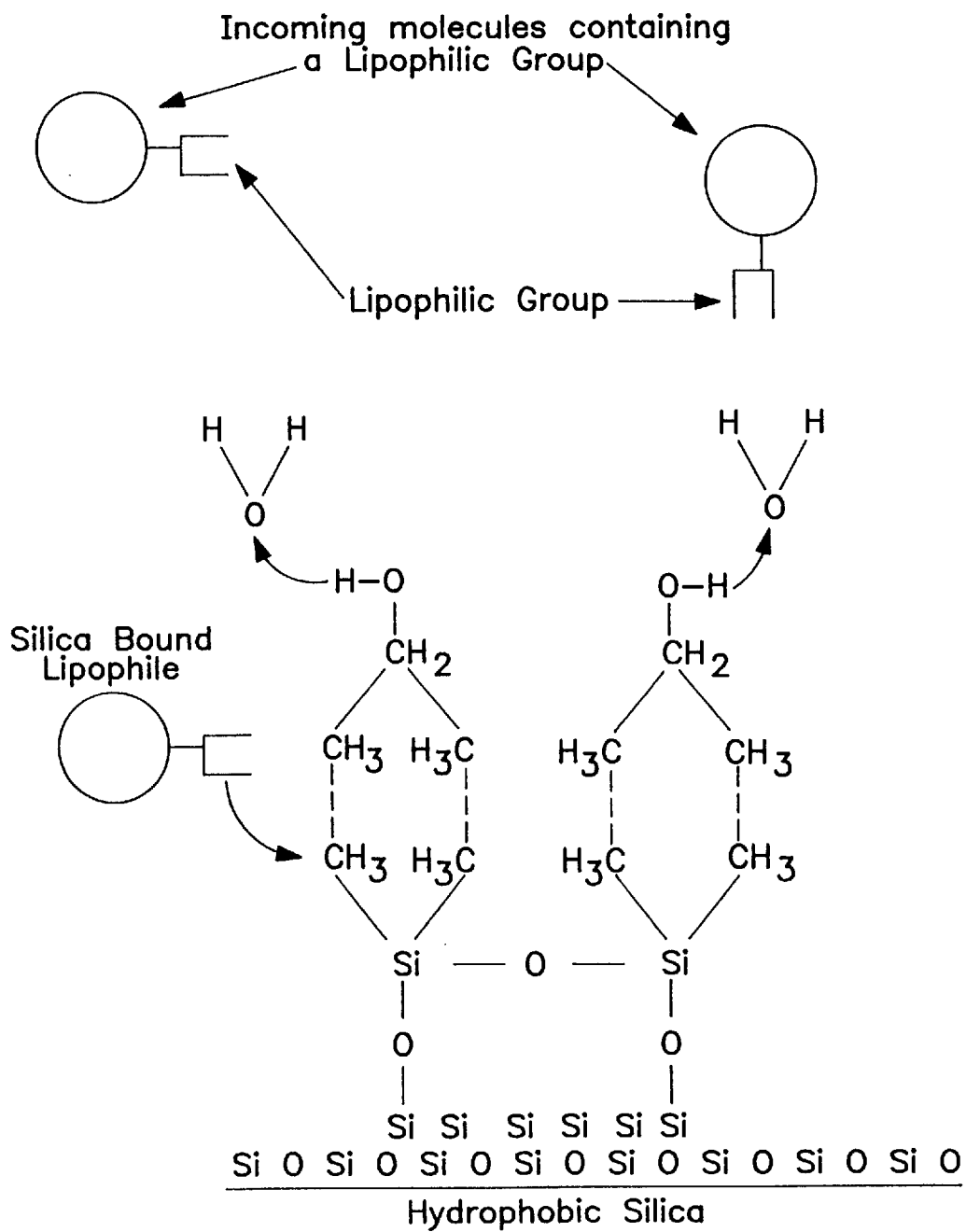
FIG. 3 shows the mechanism of lipophilic adsorption to the material of FIG. 2.

The starting materials utilized in the present invention are derived from hydrophilic silica, suitably pyrogenic silica. Such materials are commercially available. These silica are networked materials initially having available oxygen sites. They are then treated with any volatile hydrocarbon substituted silicon compound which will react with the free oxygen atoms of the silica. Such compounds include dimethyldichloro silane, butyl trichlorosilane and diphenyldichlorosilane, alkoxy halo silanes such as ethoxytrifluorosilane or methoxytrichlorosilanes. The labile moieties of these silicon compounds will react directly with the available oxygen moieties of the hydrophilic silica replacing them with the hydrocarbon containing silica moieties. Such reactions are commercially known and it is not necessary to discuss them in further detail herein. The products thus obtained are commercially available.

The thus substituted hydrophobic silica is dispersed in the alcohol which is intended to attach itself to the silica. Any alcohol may be utilized, it is merely necessary to form a suspension of the silica in the alcohol. Where massive alcohols, for example phenols or aryl alkanols such as benzyl alcohol are used, it is desirable to mix them with, say, lowet alkanols to create heterogeneous complexes. A suspension of the order of between 2 and 20 weight/volume is satisfactory. The alcohol is then removed by washing suitably with a dilute saline, i.e about 1 w/v % sodium chloride in water until all of the free alcohol has been removed. It is not necessary to dry the thus formed alcoholated wettable hydrophobic silica. The minute traces of sodium chloride which will remain are of no consequence. The thus produced material may be used to absorb lipids from aqueous solutions containing same. This material however, does not readily differentiate between lipids and proteins.

In order to achieve such differentiation an aqueous suspension of the alcoholated wettable hydrophobic silica in the previously mentioned dilute of sodium chloride is prepared. Concentration is not important. It should be set so that the suspension can be readily stirred. To this suspension is added an aqueous solution of either ammonia or a primary or secondary amine. Any water soluble amine may be utilized however, from the point of view of convenience and economy, ammonia is preferred. A solution of between of 0.25 and 1.5 w/v % is suitable, a 1 w/v % aqueous solution of ammonia being preferred. The mixture is stirred gently for between 30 minutes and two hours. Gentle stirring is required so that the silica particles do not abrade each other to form lines. The ammonia/amine solution is then removed suitably by centrifugation of the slurry followed by repeated water washing of the remaining gel.

The slurries can then be utilized to remove lipids per se, or lipids in the presence of proteins.

In this procedure the silica particles are suspended in an aqueous medium, suitably, in phosphate dilute saline (suitably ca 1% w/v) at a gel to liquid ratio of between 1:1 through to 1:4 suitably 1:2. Equal volumes of the gel suspension and the lipid/protein suspension were then vortexed for about 5 seconds and mixed by container reversal, the gel removed by filtration and the supernate examined for liquid and/or protein removal.

EXAMPLE 1

Alcoholated wettable hydrophobic Silica

Hydrophobic silica Aerosil R976 (particle size: 7 nanometers, surface area: 250 $m^2$/gram, Degussa) is dispersed in isopropyl alcohol to yield a 5% weight/volume suspension. This transforms the inactive, non-water wettable, powder into an alcohol solvated form.

A large volume of an aqueous solution containing 0.9 gram % (w/v) of sodium chloride is added to the suspension while stirring. After the gel particles have settled the supernatant is removed and discarded. The gel particles are washed with saline in order to remove traces of free alcohol. The resulting final product, an activated hydrophobic silica is a complex consisting of hydrophobic silica-isopropyl alcohol-water.

In accordance with the above procedure but where, in place of using a methyl substituted hydrophobic silica, there is utilized one substituted by ethyl, propyl, isobutyl, propenyl, butenyl, phenyl, benzyl or 1-propenylphenyl groups, a similar product is obtained.

In accordance with the above procedure but where, in place of using isopropanol, there is utilized ethanol, propanol, isobutanol, 1-propanol, 2-butanol, phenol, benzyl alcohol or 1-propenylphenol, a similar product is obtained.

EXAMPLE 2

Ammoniated Alcoholated wettable hydrophobic Silica

To 100 milliliters of a stirred suspension of activated hydrophobic silica in saline (Example 1), an equal volume of a 1.0% aqueous solution of ammonia was added. The mixture was gently stirred for 1 hour at room temperature. Excess ammonia was then removed by centrifugation of the slurry, followed by repeated water washing of the pellet. The final pH of the preparation was 9.3, and the gel to liquid ratio was 1:3.

In accordance with the above procedure but where, in place of using ammonia, there is utilized methylamine, ethylamine, propylamine, isobutylamine, propenylamine, butenylamine, phenylamine, benzylamine or 1-propenylphenylamine, a similar product is obtained.

EXAMPLE 3

Testing of Ammonia modified Hydrophobic Silica

The activated hydrophobic silica which had been reacted with ammonia (R976-$NH_3$, Example 2) was stored for one month at room temperature prior to testing on lipid mixtures and proteins. Unmodified activated hydrophobic silica (R976) was also included for comparative reasons.

Experiments were conducted on (1) 1.0% lipid mixture in PBS, (2) 1.0% BSA solution in PBS, and (3) 1.0% IgG solution in PBS (Table 1). The gel to liquid ratios of R976-NH$_3$ and R976 to 0.9% saline, were 1:2 respectively. Equal volumes of gel suspension and either lipid or protein were employed. The mixtures were vortexed for about 5 seconds and then placed in a closed container and gently mixed for 15 minutes by reversal of the container followed by centrifugation for 10 minutes at 3000, and decantation.

TABLE 1

Binding Capacity of Derivatized Hydrophobic Silica

| Preparation | % Lipid Removal* | % BSA Removal | % IgG Removal |
|---|---|---|---|
| R976-NH$_3$ | 83.0 | 16.0 | 39.0 |
| R-976 | 68.0 | 25.0 | 84.0 |

*Based on absorption at 550 nm.

The experiments were conducted on isolated protein systems, herefore, the results do not reflect the results that would be obtained in a competitive situation (e.g. Serum, tissue culture, etc.). Based upon these results, the modified silica has a higher lipid binding capacity and a lower protein binding capacity than the unmodified version.

EXAMPLE 4

Modified Hydrophobic Silica: Ascites Treatment

Activated hydrophobic silica which was reacted with ammonia (Example 2) was tested for its ability to clarify a very turbid sample of ascites fluid: the adsorbent to ascites fluid ratio was 1:4. CLEANASCITE treated ascites was also included in the experiment. (CLEANASCITE is an alcohol/water activated hydrophobic silica based on Aerosilr 972). Turbidimetric readings were conducted at 550 nanometers.

TABLE 2

Ascites Treatment

| Preparation | A$_{550}$ | % Clarification |
|---|---|---|
| Untreated Ascites | 2.2 | — |
| NH$_3$ Modified Hydrophobic Silica (R976) | 0.21 | 90.5 |
| Cleanascite | 0.84 | 62.0 |

Conclusion

Modified hydrophobic silica removed more of the components responsible for the turbidity of ascites than CLEANASCITE: 90.5% versus 62.0%.

EXAMPLE 5

Testing of Ammonia Modified Hydrophobic Silica on Protein-Lipid Mixtures

Experiments were conducted using a solution of IgG (10 mg/mL) containing 10 mg/mL of lipids, buffered in PBS, pH 7.3. The lipid mixture goes under the name Soy-Lecithin Granules (distributed by Nat-Rul Health Products, Chestnut Ridge, N.Y., 10977).The gel to liquid ratios of R976-NH$^3$ and the unmodified R976 were 1:2 respectively. Equal volumes of gel suspension and the protein-lipid mixture were employed. Absorbency measurements were made at 280 nanometers for the protein and at 550 nanometers for lipid (Table 3).

TABLE 3

Percent IgG and Lipid Removal

| Preparation | % Lipid Removal | % IgG removal |
|---|---|---|
| R976-NH3 (Ex. 2) | 85 | 21 |
| R976 (Ex. 1) | 67 | 75 |

As shown above, less protein binding for the ammonia treated R976 was evident in the presence of lipid than for the untreated form as previously shown. The lipid binding capacity of the gels remained unaffected by the presence of protein.

I claim:

1. A process for the the preporation of hydrophobic silica capable of binding lipids comprising the steps of
    a) treating particles of pyrogenic hydrogenic hydrophobic silica wherein R$^1$ groups are attached to the silicon of said hydrophobic silica, with R$^2$OH,
    b) and washing said R$^2$OH treated hydrophobic silica with water until the R$^2$OH is no longer present in the supernate, wherein R$^1$ and R$^2$ are the same or different and are selected from the group consisting of alkyl, alkenyl, aryl, aralkyl and aralkenyl wherein the particles have a size of between 5 and 10 nanometers and a surface area of between 150 and 300 m$^2$/gram.

2. A process for the preparation of hydrophobic silica capable of lipophilic binding comprising the steps of
    a) treating particles of pyrogenic hydrophobic silica wherein R$^1$ groups are attached to the silicon of said hydrophobic silica, with R$^2$OH,
    b) and washing said R$^2$OH treated hydrophobic silica with water until the R$^2$OH is no longer present in the supernate, wherein R$^1$ and R$^2$ are the same or different and are selected from the group consisting of alkyl, alkenyl, aryl, aralkyl and aralkenyl and
    c) treating with aqueous R$^3$,R$^4$,NH in the absence of an alcohol wherein R$^3$ and R$^4$ may be the same or different and are selected from the group consisting of hydrogen, alkyl, alkenyl, aryl, araikyl or aralkenyl.

3. The process of claim 1, wherein the hydrophobic silica of step a) has been produced by flame hydrolysis of a volatile silicon compound in an oxygen/hydrogen flame followed by treating hydrophilic silica with an R$^1{}_n$X$_m$Si compound where n and m are 1,2, or 3 and n+m is 4, and X is halo to form R$^1{}_n$Si substituted hydrophobic silica.

4. The process of claim 3, wherein the volatile silicon compound is silicon tetrachloride.

5. The process of claim 2, wherein the hydrophobic silica of step a) has been produced by flame hydrolysis of a volatile silicon compound in an oxygen/hydrogen flame followed by treating hydrophilic silica with an R$^1{}_n$X$_m$Si compound where n and m are 1,2, or 3 and n+m is 4, and X is halo to form R$^1{}_n$Si substituted hydrophobic silica.

6. The process of claim 5, wherein the volatile silicon compound is silicon tetrachloride.

7. The process of claim 1, wherein R$^1$ and R$^2$ are the same or different and are lower alkyl of 1–6 carbon atoms.

8. The process of claim 7, wherein R$^1$ is methyl and R$^2$ is isopropyl.

9. The process of claim 2, wherein R$^3$ and R$^4$ are hydrogen or lower alkyl of 1–6 carbon atoms.

10. The process of claim 9, wherein $R^1$ is methyl, $R^2$ is isopropyl and $R^3$ and $R^4$ are hydrogen.

11. A hydrophobic silica produced in accordance with claim 2, wherein said hydrophobic silica is capable of lipophilic binding with reduced protein binding capacity.

12. A hydrophobic silica produced in accordance with claim 5, wherein said hydrophobic silica is capable of lipophilic binding with reduced protein binding capacity.

13. A hydrophobic silica produced in accordance with claim 9, wherein said hydrophobic silica is capable of lipophilic binding with reduced protein binding capacity.

14. A hydrophobic silica produced in accordance with claim 10, wherein said hydrophobic silica is capable of lipophilic binding with reduced protein binding capacity.

15. A hydrophobic silica in accordance with claim 14, wherein the particles of said hydrophobic silica have a size of between 5 and 10 nanometers.

16. A hydrophobic silica in accordance with claim 14, wherein the particles of said hydrophobic silica have a surface area of between 150 and 300 $m^2$/gram.

17. A hydrophobic silica in accordance with claim 14, wherein the said $R^1$ and $R^2$ groups are non covalently bonded to each other.

18. A hydrophobic silica in accordance with claim 14, wherein the water is hydrogen bonded to the alcoholic hydroxyl group.

19. A process of preferentially absorbing lipids in the presence of proteins from aqueous media which comprises treating said medium with a silica of claim 11.

20. A process of preferentially absorbing lipids in the presence of proteins from aqueous media which comprises treating said medium with a silica of claim 12.

21. A process of preferentially absorbing lipids in the presence of proteins from aqueous media which comprises treating said medium with a silica of claim 15.

22. A process of preferentially absorbing lipids in the presence of proteins from aqueous media which comprises treating said medium with a silica of claim 16.

* * * * *